Feb. 22, 1927.
J. PATTERSON
CLUTCH
Filed Oct. 15, 1925
1,618,470
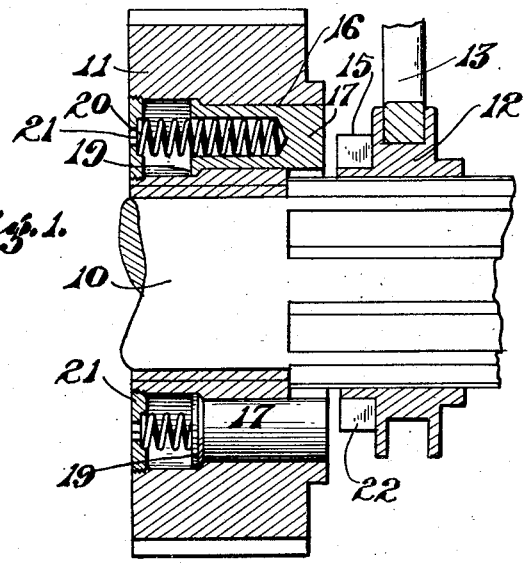
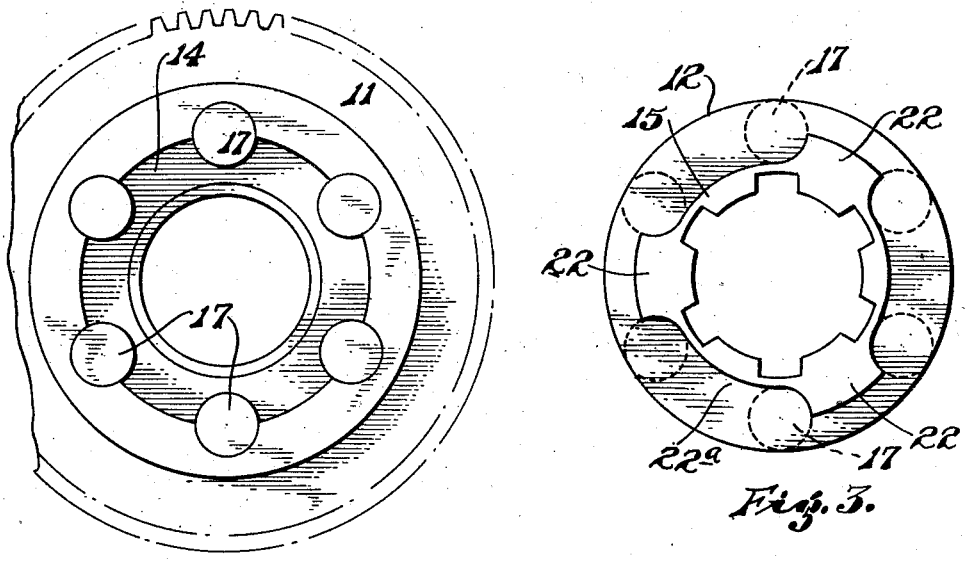
INVENTOR.
JOHN PATTERSON
BY Dewey, Strong, Townsend & Loftus.
ATTORNEYS.

Patented Feb. 22, 1927.

1,618,470

UNITED STATES PATENT OFFICE.

JOHN PATTERSON, OF OAKLAND, CALIFORNIA, ASSIGNOR TO JOHN PATTERSON INVENTIONS, INC., OF RENO, NEVADA, A CORPORATION OF NEVADA.

CLUTCH.

Application filed October 15, 1925. Serial No. 62,498.

This invention relates to clutches and particularly pertains to clutch mechanisms of the jaw type.

It is the principal object of the present invention to provide a generally improved jaw clutch which is capable of being immediately and positively engaged regardless of the different relative speeds or positions of the clutch parts.

In carrying out this object I provide a pair of clutch members which are fitted with jaws adapted to mesh to connect them. The jaws of one member are yieldingly mounted and are movable in an axial direction so that the members may be moved into engaging positions regardless of the different relative positions thereof. To insure engagement of the jaws, the jaws of the other member are less in number than the yielding jaws, so that should the jaws engage and depress the yielding jaws, one of the latter will be unaffected and will act immediately to align the parts so that all of the jaws will assume operative positions.

One form which the invention may assume is exemplified in the following description and illustrated by way of example in the accompanying drawings, in which:

Fig. 1 is a view of a clutch in central vertical section disclosing my invention as applied to a constant mesh gear transmission.

Fig. 2 is a view in elevation of one of the clutch halves disclosing the positions and the mounting of the movable jaws.

Fig. 3 is a view in elevation of the face of the other clutch half disclosing the formation of the jaws thereon, and indicating the yielding jaws of the other clutch half in dotted lines.

Referring more particularly to the accompanying drawings, 10 indicates a drive shaft upon which the clutch embodying the present invention is mounted. The clutch mechanism disclosed in the present instance is of a construction such as would be applied to a constant mesh gear transmission wherein different gears or combinations thereof are clutched to the shaft or to each other to obtain different speed ratios between a driving and a driven shaft.

The clutch illustrated comprises a gear or clutch member 11 which is held from axial movement on the shaft but is normally freely rotatable thereon. Adjacent this gear is a clutch half 12 which in the present instance is fitted with a shifting yoke 13 by means of which it may be shifted into and out of engagement with the gear 11 which comprises the other clutch half. The clutch half 12 is splined on the shaft and may act to transmit the rotation of the shaft to the gear 11 when it is clutched to the latter.

The gear 11 is formed with a counter-bore 14 in its face which is adjacent to the clutch half 12. This counter-bore is of sufficient diameter and depth to accommodate the jaw portion 15 formed on the clutch half 12. Formed around the periphery of the counter-bore 14 is a plurality of evenly spaced sockets 16 which are parallel and arranged axially of the gear. These sockets each accommodate a yielding clutch pin 17 which constitute the clutch jaws of the gear or clutch half 11. The sockets 16 are enlarged at the side of the gear opposite the counter-bore to form a shoulder against which an annular shoulder 19 on the clutch pins may abut to limit the axial movement of the pins in an outward direction toward the clutch half 12.

The clutch pins or yielding jaws 17, when in their outermost position, project through the counter-bore and align with the face of the gear or the hub thereon. To normally maintain the pins in this position compression springs 20 are interposed between the inner ends of the clutch pins or yielding jaws 17, and plugs 21 threaded in the enlarged end of the sockets 16.

Reference being had to Fig. 2 it is seen that the axial centers of the clutch pins 17 occur on the periphery of the counterbore 14 so that the half of the portion of each pin which projects through the counter-bore will be embedded within the gear. Therefore, when the clutch is engaged, the clutch pins or yielding jaws 17 in the gear will be subjected to a shearing stress only.

For cooperation with the yielding jaws 17, the jaw portion 15 of the clutch half 12 is formed with three radially projecting jaws 22 which are each of a radial length to fit snugly between adjacent clutch pins or yielding jaws 17 in the counterbore 14 of the gear 11. The jaws 22 are evenly spaced apart so as to engage or project between alternate pairs of the clutch pins 17 in the gear. The recesses 22ª occurring between the jaws 22 in the clutch half 12 extend between alternate pairs of the clutch pins 17 to insure engagement of the jaws 22 and the pins 17 regardless of the relative positions of the clutch halves when brought together. This is readily accomplished due to the provision of a lesser number of jaws 22 than spaces between the clutch pins 17.

It can be readily seen that should the clutch member 12 be moved into operative engagement with the gear 11, when the radial position of the parts is such that the jaws 22 will engage the ends of the clutch pins or yielding jaws 17, those pins engaged will be depressed to permit the jaws 22 to advance to an operative position relative to the clutch pins or yielding jaws 17. As the jaws 22 are less in number than the pins 17, at the most, the jaws will only depress a number of pins equal to the number of jaws. The remaining pins will not be engaged and will therefore remain in extended position projecting through the counter-bore in the gear and through the peripheral recesses 22ᵃ intermediate the jaws 22. Therefore, immediately the relative positions of the clutch halves are changed sufficiently to cause engagement between the unengaged pins and the jaws, the clutch halves will perfectly align relative to each other and the depressed clutch pins will be disengaged and will assume operative positions. This will effect a perfect clutching engagement between the clutch halves.

It is obvious that the effect just described will be the same regardless of the relative speeds or directions of travel of the parts. Also the clutching operation will be effected quietly without clashing of the clutching parts which has a disastrous effect on the jaws. It is also manifest that a jaw 22 may be provided between each pair of clutch pins 17 except one. This would permit one clutch pin to project between the jaws 22 and effect alignment between the clutch pins and the jaws 22 and cause them to properly engage automatically when the pin abuts against an adjacent jaw 22.

While in the present instance I have shown the clutch as applied to a constant mesh gear transmission, it is understood that I do not limit myself to this application as I am fully aware that my invention is applicable to any of the various uses to which clutches may be put.

From the foregoing it is obvious that I have provided a jaw clutch which may be immediately and positively engaged regardless of the relative clutch speeds or positions of the clutch halves.

While I have shown the preferred form of my invention, it is to be understood that various changes in its construction may be made by those skilled in the art without departing from the spirit of the invention as defined in the appended claims.

Having thus described my invention, what I claim and desire to secure by Letters Patent is:

1. A clutch comprising a pair of members adapted to rotate about a common axis, a counter-bore formed concentrically within the face of one of said members, a plurality of axially extending sockets formed in a circle about the axis of said member and spaced equal distances apart, the centers of said sockets occurring substantially at the periphery of said counter-bore, a plurality of clutch jaws reciprocably disposed in said sockets and adapted to project through the counter-bore, spring means associated with said jaws for maintaining them in projected position, clutch jaws fixed to the other member and adapted to project within the counter-bore in the other member and engage the movable jaws to effect a clutching engagement between the members.

2. A clutch comprising a pair of members adapted to rotate about a common axis, a counter-bore formed concentrically within the face of one of said members, a plurality of axially extending sockets formed in a circle about the axis of said member and spaced equal distances part, the centers of said sockets occurring substantially at the periphery of said counter-bore, a plurality of clutch jaws reciprocably disposed in said sockets and adapted to project through the counter-bore, spring means associated with said jaws for maintaining them in projected position, clutch jaws fixed to the other member and adapted to project within the counter-bore in the other member and engage the movable jaws to effect a clutching engagement between the members, the number of fixed jaws being less than the number of movable jaws whereby to insure engagement between said jaws.

3. A clutch comprising a pair of members adapted to rotate about a common axis, a recess formed concentrically within the face of one of said members, a plurality of axially extending sockets arranged in a circle about the axis of said member and spaced equal distances apart, said sockets being located at the periphery of said recess, and of dimensions causing them to extend beyond the boundry of said recess, a plurality of depressible clutch jaws reciprocably disposed in said sockets and adapted to project within the recess, clutch jaws fitted to the other member and adapted to project within the recess between said depressible jaws to engage said depressible jaws and effect a clutching engagement between the members, due to the recess and the sockets therein extending beyond the boundry of said recess a shearing stress only will be placed upon said depressible jaws.

4. A clutch comprising a pair of members adapted to rotate about a common axis, a recess formed concentrically within the face of one of said members, a plurality of axially extending sockets arranged in a circle about the axis of said member and spaced equal distances apart, said sockets being located at the periphery of said recess and of dimensions causing them to extend beyond the boundary of said recess, a plurality of depressible clutch jaws reciprocably disposed in said sockets and adapted to project within the recess, clutch jaws fitted to the other member and adapted to project within the recess between said depressible jaws to engage said depressible jaws and effect a clutching engagement between the members, due to the recess and the sockets therein extending beyond the boundary of said recess a shearing stress only will be placed upon said depressible jaws, the number of fixed jaws being less than the number of depressible jaws whereby to insure engagement between said jaws.

JOHN PATTERSON.